INVENTORS
LEON CAPSUTO
THOMAS W. HIGGINS
PAUL F. BRUINS
BY
Charles J. Elderkin
ATTORNEY

United States Patent Office 3,018,316
Patented Jan. 23, 1962

3,018,316
BATTERY SEPARATORS AND METHOD FOR PRODUCING THE SAME
Thomas W. Higgins, Philadelphia, Pa., Leon Capsuto, Woodbury, N.J., and Paul F. Bruins, Douglaston, N.Y., assignors to Polytechnic Institute of Brooklyn, a corporation of New York
Filed Dec. 23, 1957, Ser. No. 704,398
14 Claims. (Cl. 136—144)

The present invention relates, in general, to new compositions of matter. More particularly, the invention contemplates the provision of novel hydrophilic, polymeric, gelled materials adapted for use as separators or diaphragms for galvanic cells, and, in particular, dry cell batteries.

In the conventional dry cell battery, and notably the so-called "Leclanché" type dry cell battery, it is standard practice to employ separators or diaphragms for the purpose of separating the zinc anode from the depolarizer mixture which usually comprises manganese dioxide, carbon and electrolyte. It is now firmly established that separator materials suitable for use in dry cells should possess certain physical and chemical characteristics. Physically, the materials must be of sufficient strength and of such a general nature that they can be handled, without damage, by automatic machinery used in the manufacture and assembly of the cells. The materials should also retain sufficient strength after assembly within a cell to prevent accidental rupture or perforation of the same, and consequent short-circuiting of the cell. In addition, the separator material should be relatively insoluble in water; resistant to oxidation by manganese dioxide; capable of absorbing electrolyte; of relatively low electrical resistance; and as thin as possible, since it occupies cell space to the exclusion of active materials.

At present, two basic types of commercial separators are in use, namely, a starch-flour paste mixture with or without a paper backing, and methyl cellulose-coated paper. The starch-flour paste separators, however, tend to deteriorate and hydrolyze under the influence of the various cell components. Furthermore, they tend to react with the manganese dioxide in the depolarizer mixture with subsequent reduction in the capacity of the cell. Methyl cellulose separators, on the other hand, are readily oxidized by manganese dioxide to a considerable extent.

It is the principal object of this invention to provide commercially feasible battery separators which are relatively insoluble in water and aqueous electrolyte solutions. A specific object of the invention is the provision of hydrophilic, cross-linked polyacrylamide compositions suitable for use as battery separators, which are highly resistant to oxidation by manganese dioxide and exhibit relatively low electrical resistance. A still further object of the invention is the provision of dry cell separators of the general class described which satisfactorily meet all the physical and chemical characteristics aforesaid.

Additional features and objects of the invention will become apparent, and the invention itself may be best understood, by reference to the following detailed description and specific examples, taken in conjunction with the accompanying drawing, wherein:

FIG. 1 a cross-sectional view, in exaggerated form, of one embodiment of the invention illustrating a typical cross-linked polyacrylamide separator element;

Figure 1:
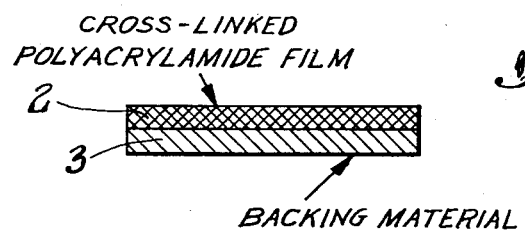
Figure 2:
FIG. 2 illustrates another form of separator of the invention.
Figure 3:
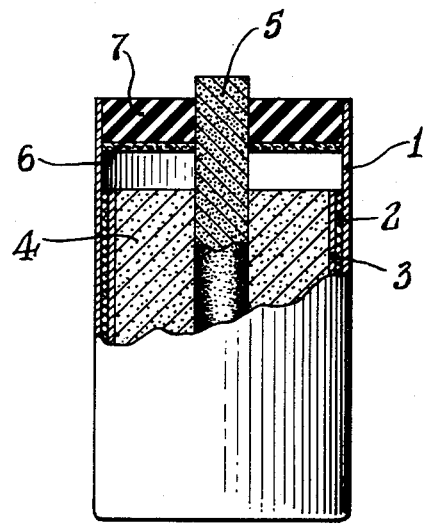
FIG. 3 is a side elevation view, partly in section, of a conventional dry cell provided with a separator similar to that illustrated in FIG. 1.

As shown in FIG. 3, a zinc container-electrode 1 is provided with a film 2 of a substantially water-insoluble cross-linked polyacrylamide resin. The cross-linked polyacrylamide film 2 is backed by a suitable backing material 3 as best seen by reference to FIG. 1. Depolarizer mixture 4, wet with electrolyte, is provided within the container electrode 1 adjacent the backing material 3, and a carbon electrode 5 is positioned in the depolarizer mixture 4. The cell is sealed at the top in conventional manner, as, for example, by means of fiber washer 6 and a layer of sealing compound 7, such as pitch or any other suitable sealing composition.

The cross-linked, hydrophilic polyacrylamide separators of the invention may be conveniently characterized as having water-solubility and electrical resistance equal to or less than methyl cellulose. In contrast to the latter material, however, they are outstanding in their resistance to oxidation by manganese dioxide.

Polyacrylamide, as is known, is completely soluble in water when its polymeric structure is linear in nature. The resin may be characterized by the structural formula:

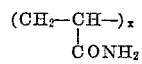

It is necessary, therefore, to cross-link the polyacrylamide to a certain extent to render it water-resistant or substantially water-insoluble. As used herein, the terms "water-insoluble," "water-resistant" and "substantially insoluble" are intended to comprise polyacrylamides which have been cross-linked to the extent of rendering them water-insoluble within the limits defined hereinafter. Thus, the polymeric substances used in the production of the unique separators of the invention may possess some degree of solubility (up to 26% in water or conventional battery electrolytes) or they may be substantially insoluble (zero solubility) within water and battery electrolyte. In actual practice, we prefer to employ a cross-linked polymer of minimum solubility consistent with the retention of sufficient hydrophilic properties to insure efficient electrolyte absorption. That is to say, in general, the absorption of electrolyte is a function of the insolubility of the separators, and excessive cross-linking of a normally soluble polyacrylamide resin detracts from the hydrophilic nature of the polymer and, hence, decreases its electrolyte absorption capacity. As illustrated by the experimental data presented hereinafter, however, we have found it to be possible to make a substantially insoluble cross-linked polyacrylamide resin which still exhibits satisfactory absorption of electrolyte. The solubility of the resin systems of the invention is, of course, a function of the amount of cross-linking agent employed in treating a normally water-soluble polymer, and may be conveniently determined by measuring the weight loss of a separator after it has been permitted to stand in water for an extended period.

The superior low electrical resistance of the separators of the invention has been established by a series of experiments in which several of the substantially water-insoluble cross-linked polyacrylamide separators were compared with a commercial methyl cellulose separator. In these tests, the separators consisted of polyacrylamide cross-linked with formaldehyde (as formalin) coated on 30 lb./ream high wet-strength kraft paper. The electrical resistance was determined by employing a cell of standard conductivity in which a piece of the separator is placed over the opening connecting the two sections of the cell, and the resistance of the modified cell measured. The actual separator resistance is obtained by subtracting the normal resistance of the cell without a separator. When the resulting value is multiplied by the area of the separator, the resistance in ohms per unit area is obtained.

The following tabulated test data favorably reflect the electrical resistance characteristics of typical polyacrylamide separators of the invention as compared with standard methyl cellulose separators:

TABLE I

| Example No. | Separator | Percent Cross-Linking Agent | Resistance Milliohms in.$^2$ |
|---|---|---|---|
| 1 | Polyacrylamide | 0.5% formalin | 32.0 |
| 2 | do | 1.0% formalin | 34.5 |
| 3 | do | 5.0% formalin | 44.3 |
| 4 | do | 10% formalin | 45.0 |
| 5 | do | 15% formalin | 45.0 |
| 6 | Methyl cellulose | | 44.0 |

As previously noted, the separators of the invention also possess superior resistance to oxidation by manganese dioxide as compared with commercial separators such as starch-flour mixtures and methyl cellulose. The interaction of manganese dioxide with a separator material can occur in two ways. Thus, the manganese dioxide can attack the gel itself, or it can react with the soluble components of the gel. An unsupported separator is subject to both types of reaction, whereas in a supported separator the second type of reaction predominates. To determine the resistance of a separator to the summation of these two effects, the separator is placed in contact with manganese dioxide and battery electrolyte for a period of two weeks at a temperature of 70° C. The extent of the oxidation of the separator is then determined on the basis of the amount of unreacted manganese dioxide present as compared to the amount originally present. The value is expressed in terms of percent reduction of manganese dioxide. The following tabulated data illustrate comparative results, in terms of the percent reduction of manganese dioxide, obtained with separators of the invention and the aforesaid commercial separators.

TABLE II

| Separator: | Percent Reduction on $MnO_2$ |
|---|---|
| Starch-flour, 1:1 mixture | 14.6 |
| Methyl cellulose | 9.8 |
| Polyacrylamide | 2.2 |

The foregoing results indicate that the separators of the invention are 4.5 and 7 times more resistant to manganese dioxide oxidation than methyl cellulose and starch-flour separators, respectively. This is indeed significant since the greater the oxidation by manganese dioxide, the shorter is the cell life.

The water-resistant polyacrylamide separators of the invention can be readily prepared in a variety of ways. For example, water-soluble polyacrylamide can be methylolated or cross-linked by treating with aqueous formaldehyde (formalin) while controlling and maintaining the pH of the mixture below about seven. The solution is then coated on a supporting member or backing or coated directly to a zinc anode by dip-coating, spraying, slushing and the like. The coatings are then dried, at an elevated temperature if desired, to provide water resistant gels. Although polyacrylamide can be methylolated with formalin at a higher pH, say in the range of 9.5–10, with sodium carbonate, the resulting methylolated polyacrylamide will not cross-link as readily and it may take weeks to gel. It is preferred, therefore, to prepare the water-resistant cross-linked polyacrylamide gel by controlling the pH of the solution at below about pH 7.0 prior to the coating and drying operations.

It is sometimes desirable to employ additives in the polyacrylamide-formalin solution to alter and enhance the characteristics of the separators. For example, zinc chloride, ammonium chloride and/or mercuric chloride can be added to the solution such that after coating and drying, particles of the aforesaid chlorides will be dispersed in the gel. For additive-containing gels having optimum properties it is advantageous to control and maintain the pH of the polyacrylamide-formalin solution in the range of from 2.5 to about 3.5. At pH values above the preferred ranges, precipitation of zinc chloride occurs, whereas at pH values below about 2.5 the gels are brittle when dried and tend, to some degree, to show poor electrolyte absorption and high electrical resistance. Of course, as pointed out hereinbefore, in the absence of such additives the operative pH range for the PAM-formalin solutions may be substantially wider.

Since the function of the mercuric chloride is to amalgamate the zinc electrode for the purpose of preventing severe localized attack, it is most convenient to add the same to the polyacrylamide and formalin solution prior to casting, although the same effect can be readily accomplished by any other means. Preferably, the amount of mercuric chloride employed as a component of the polyacrylamide-formalin solution is from 1.5 percent to 4.5 percent by weight based on the weight of dry polyacrylamide charged to the solution.

Water-resistant, cross-linked polyacrylamide separators can be prepared, also, by polymerizing an aqueous solution, or a solution of battery electrolyte, of monomeric acrylamide and a cross-linking agent such as methylene bis-acrylamide in the presence of a suitable redox polymerization catalyst such as ammonium persulfate or a combination of ammonium persulfate with another catalyst such as nitro tris-propionamide, sodium thiosulfate, potassium ferricyanide, sodium bisulfite or triethanol amine. The aforementioned catalyst systems are preferred for use in water solutions of acrylamide and cross-linking agent, whereas in electrolyte solutions, catalysts such as ammonium persulfate and ammonium or sodium bisulfite; tertiary-butylhydroperoxide and ammonium or sodium bisulfite are preferred.

The separators prepared from monomeric acrylamide and a cross-linking agent tend to form irreversible gels and are preferably coated directly onto the zinc anode and polymerized in situ. This can be readily accomplished by either adding the catalyst to the solution and applying the resulting solution to the anode by any convenient means, or by applying the uncatalyzed solution to the anode and thereafter applying the catalyst to the coated anode by dipping, spraying, and the like.

As hereinbefore pointed out, it is desirable to have the separator as thin as possible. Although the thickness of the film is not necessarily critical, it has been found that separators exhibiting all of the desirable physical and chemical characteristics detailed above are obtained when the thickness of the dried films or gels is about 1.5 mils.

The gel coatings of cross-linked polyacrylamide, with or without the additives such as zinc chloride, ammonium chloride or mercuric chloride, are preferably provided with a backing material to give added mechanical strength. A wide variety of inert backing materials can be employed in addition to high wet strength paper including fabrics, woven or non-woven, prepared from copolymers of vinylidene chloride and vinyl chloride; vinyl chloride and acrylonitrile; vinyl chloride and vinyl acetate containing various amounts of copolymerized vinyl chloride, polyethylene, and the like.

The following examples will serve to illustrate the novel compositions of the invention, the methods of preparing them, and the utility of the products produced thereby:

*Example 1*

Twenty (20) parts of polyacrylamide powder, having a viscosity in the range of 180±50 centipoises when measured as a five percent (5.0%) aqueous solution at 25° C. with a Brookfield viscosimeter, were dissolved in 180 parts of water containing 0.6 part of mercuric chloride ($HgCl_2$), and the pH of the solution was then adjusted to 1.6 with hydrochloric acid. Thereafter, three parts of formalin (37 percent aqueous solution of formaldehyde) were added to the solution. The solution was immediately coated on a 30-lb./ream high wet-strength kraft paper with a doctor blade. The wet film was 22 mils thick, and was dried at 70° F. for 2 hours. The thickness of the final dry film was 1.5 mils. The cross-linked polyacrylamide separator was characterized by a solubility less than 25 percent, a resistance to oxidation equivalent to a 2.2 percent reduction of manganese dioxide and an electrolyte absorption of 2 to 3 grams per gram of separator.

Prototype cells were constructed using the aforesaid separator and a commercial methyl cellulose separator. After two weeks storage, they were discharged through a 25 ohm resistance to a 1 volt end-point. The results showed that the cross-linked polyacrylamide gel separator had an 11 percent greater capacity than the commercial methyl cellulose separator. Similar tests after 26 weeks showed that the polyacrylamide separator was 2.3 percent superior to the commercial methyl cellulose separator.

The foregoing formulation was also used to coat a non-woven fabric (EM-309; Kendall Mills) consisting of a 50-50 vinyl chloride-acrylonitrile copolymer (Dynel—tradename). The fabric was made with 2-denier Dynel fibers formed into a thin non-woven mat and calendered to a thickness of 1 mil. The calendering also provided the heat which caused the bonding of the fibers. It was found that these fibers are extremely chemically resistant and are not affected by battery electrolyte under any conditions. Since the fabric was extremely porous, it was coated by dipping the fabric into the liquid coating material and then removing the excess from both sides by means of a pair of rollers. The amount left on the fabric was sufficient to produce a vinyl coated separator which was 2 mils thick. The extreme thinness of this type of reinforced separator is one of its advantages.

*Example 2*

Twenty (20) parts of polyacrylamide powder, having a viscosity in the range of 180±50 centipoises when measured as a five percent (5.0%) aqueous solution at 25° C. with a Brookfield viscosimeter, were dissolved in 180 parts of water containing 0.6 part of mercuric chloride ($HgCl_2$), and the pH of the solution was then adjusted to 1.7 with hydrochloric acid. Thereafter, two parts of formalin (37 percent aqueous solution of formaldehyde) were added to the solution. The solution was immediately coated on a 30-lb./ream high wet-strength kraft paper with a doctor blade. The wet film was 22 mils thick and was dried at 80° F. for one and ¾ hours. The thickness of the final dry film was 1.5 mils. This cross-linked polyacrylamide separator had an electrolyte absorption of 2.5 grams per gram of separator, a solubility of 26 percent and its resistance to oxidation was equivalent to 2.2 percent reduction of manganese dioxide.

Prototype cells were constructed using the aforesaid separator and a commercial cereal-coated paper, and the cells were then discharged as described in Example 1. The results of these tests, following three months of storage, are presented in tabulated form below:

| Test | End Point Voltage, V. | Capacity, Hours | |
|---|---|---|---|
| | | PAM-Coated Paper | Cereal-Coated Paper |
| 16⅔ ohm continuous (70° F.) | 1.00 | 9.55 | 8.80 |
| 166⅔ ohm continuous (113° F.) | 1.00 | 156 | 88.4 |

The tests establish the cross-linked polyacrylamide separator to be 8.5 percent better than the cereal-coated paper in the 16⅔ ohm, 70° F. test, and 75 percent better in the 166⅔ ohm, 113° F. test.

*Example 3*

Ten (10) parts of a mixture comprising 95 percent acrylamide and five percent (5.0%) methylene bis-acrylamide were dissolved in 190 parts of standard battery electrolyte (composed of 26 percent ammonium chloride, 22 percent zinc chloride and 52 percent water), and 1.5 percent mercuric chloride. To this solution were added 8 parts of a five percent (5.0%) aqueous solution of sodium bisulfite, and thereafter, the solution was placed on the anodes of test cells in sufficient quantity to completely cover the anodes and was allowed to polymerize in situ. The cells were then assembled and stored. The cells were discharged after 2 weeks and 9 weeks, respectively, through a 25 ohm resistance to a 1-volt endpoint. Similarly, cells employing a commercial methyl cellulose separator were made at the same time, and stored and discharged under similar conditions. A comparison of the results are as follows:

| Separator | Capacity in min., 2 weeks | Capacity in min., 9 weeks |
|---|---|---|
| Cross-linked polyacrylamide gel | 405 | 270 |
| Methylcellulose | 275 | 230 |

These data show the cross-linked polyacrylamide gels to be 48.3 percent better than a commercial methylcellulose separator after two weeks storage and 17.3 percent better after 9 weeks storage.

In the foregoing, conversion of the weight ratios will show that the mole ratio of amide groups to groups of the cross-linking agent is 46 to 1, a very large stoichiometric excess. This may be illustrated structurally as follows:

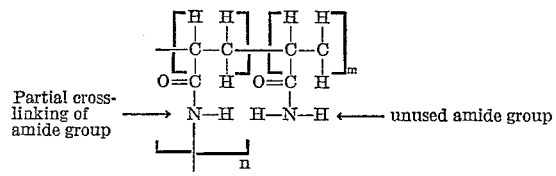

where the ratio of $m$ to $n$ is 46 to 1.

*Example 4*

A solution comprising 186 parts of the standard battery electrolyte described in Example 3, containing 1.5 percent mercuric chloride and 13.4 parts of a mixture comprising 95 percent acrylamide and five percent (5.0%) methylene bis-acrylamide was prepared. To this solution were added 10.7 parts of a five percent (5.0%) aqueous solution of sodium bisulfite. The solution was then placed on the anodes of test cells in sufficient quantity to cover them completely, and polymerization was allowed to proceed. The cells were then assembled and stored and discharged after 2 weeks and 9 weeks, respectively, through a 25 ohm resistance to a 1.0-volt endpoint, and compared with cells employing commercial methyl cellulose separators prepared at the same time, and stored and discharged under similar conditions. A comparison of the results is as follows:

| Separator | Capacity in min., 2 weeks | Capacity in min., 9 weeks |
|---|---|---|
| Cross-linked polyacrylamide gel | 390 | 280 |
| Com. methylcellulose-coated paper | 275 | 230 |

These data show that cells using a cross-linked polyacrylamide separator have 41.8 percent greater capacity after two weeks storage than the methyl cellulose separator, and 21.7 percent greater capacity after 9 weeks storage.

The stoichiometric excess of amide groups over groups of the cross-linking agent noted in Example 3 is equivalent in the above.

*Example 5*

Forty (40) parts of polyacrylamide powder, having a viscosity in the range of 180±50 centipoises when measured as a five percent (5.0%) aqueous solution at 25° C. with a Brookfield viscosimeter, were dissolved in 280 parts of water containing 1.2 parts of mercuric chloride ($HgCl_2$), and the pH of the solution was then adjusted to 2.68 with hydrochloric acid. Thereafter, ten (10) parts of formalin (37 percent aqueous solution of formaldehyde) were added. The solution was immediately coated on a 30-lb./ream high wet-strength kraft paper with a doctor blade. The wet film which was 22 mils thick, was dried at 82° F. for one hour to produce a dry film of 1.5 mils thickness. This separator had an electrolyte absorption of 2.25 grams per gram of separator. It was practically insoluble and highly resistant to oxidation by manganese dioxide. It was very strong, both wet and dry, and highly flexible when dry.

Prototype cells were constructed using this separator and a commercial methyl cellulose separator. After two weeks of storage, they were discharged through a 25 ohm resistance to a 1.0-volt endpoint. The results indicated that the polyacrylamide separator had a 12 percent greater capacity than the methyl cellulose separator.

*Example 6*

A solution comprising 40 parts of zinc chloride, 1.2 parts of mercuric chloride and 280 parts of water was prepared. The pH of the solution was adjusted to 2.7 using hydrochloric acid. Forty (40) parts of polyacrylamide powder having a viscosity in the range of 180±50 centipoises when measured as a five percent (5.0%) aqueous solution at 25° C. with a Brookfield viscosimeter, were then added along with six (6) parts of formalin. The resulting solution was immediately coated on a 30-lb./ream high wet-strength kraft paper with a doctor blade to provide a wet film 22 mils thick, which, when dried at 80° F. for one hour, resulted in a final dry film having a thickness of 1.5 mils. The separator had an electrolyte absorption of 2.7 grams per gram of separator, allowances being made for the solubility of zinc chloride in the film. The separator was practically insoluble and was extremely flexible. It could be folded or creased without cracking.

Prototype cells were made employing this polyacrylamide-zinc chloride separator and commercial methyl cellulose coated paper. After two weeks storage, they were discharged through a 25 ohm resistance to a 1.1-volt endpoint. The test results indicated that the cells employing a cross-linked polyacrylamide zinc chloride separator had a 100 percent greater capacity than those using methylcellulose coated paper.

*Example 7*

A solution was prepared by dissolving thirty (30) parts of a polyacrylamide, having a viscosity in the range of 180±50 centipoises when measured as a five percent (5.0%) aqueous solution at 25% C. with a Brookfield viscosimeter, in 270 parts of water and 0.9 part of mercuric chloride ($HgCl_2$). Thereafter, 4.5 parts of formalin (37 percent aqueous solution of formaldehyde) were added. The procedure employed was the same as described in Example 3. The mixture was then coated on size "C" and size "D" standard battery cans by pouring the solution into the can and out again and allowing the residual material to dry on the can walls. Coating in this manner produces a uniform polymerized film of cross-linked polyacrylamide which assures even and constant contact with the cell anode.

Having thus described the subject matter of our invention, what it is desired to secure by Letters Patent is:

1. Process for the production of battery separator compositions comprising substantially water-insoluble, partially cross-linked polyacrylamide gelled coatings, that comprises admixing a large stoichiometric excess of a water-soluble polyacrylamide resin with an aqueous solution of formaldehyde while maintaining the pH of the mixture below about 7.0, applying the resulting solution directly to a battery anode, and thereafter effecting drying of the solution-coating to produce a water-insoluble, partially cross-linked polyacrylamide gelled coating on said anode.

2. Process for the production of battery separator compositions comprising substantially water-insoluble, partially cross-linked polyacrylamide gelled coatings, that comprises admixing a water-soluble polyacrylamide resin with an aqueous solution of formaldehyde in a proportion of one mole of formaldehyde to at least forty-five (45) moles of polyacrylamide while maintaining the pH of the mixture below about 7.0, applying the resulting solution directly to a battery anode, and thereafter effecting drying of the solution-coating to produce a water-insoluble, partially cross-linked polyacrylamide gelled coating on said anode.

3. Process for the production of battery separator compositions comprising substantially water-insoluble, partially cross-linked polyacrylamide gelled coatings, that comprises admixing a large stoichiometric excess of a water-soluble polyacrylamide resin with an aqueous solution of formaldehyde and at least one additive selected from the group consisting of zinc chloride, ammonium chloride, and mercuric chloride, and adjusting the pH of the resulting solution to a value within the range pH 2.5 to 3.5, applying the resulting solution directly to a batteryanode, and thereafter effecting drying of the solution-coating to produce a water-insoluble, partially cross-linked polyacrylamide gelled coating on said anode.

4. Process for the production of battery separator compositions that comprises applying a mixture of monomeric acrylamide, an acrylamide polymerization agent, and a polyacrylamide cross-linking agent directly onto a battery anode surface, said polymerization agent being present in sufficient quantity to effect essentially complete polymerization of said acrylamide, and said cross-linking agent being present in a substantial stoichiometric deficiency so as to effect only partial cross-linking of the resulting polyacrylamide in situ on said surface, to produce a substantially insoluble, partially cross-linked polyacrylamide gelled coating on said anode.

5. Process for the production of battery separator compositions that comprises applying a mixture of monomeric acrylamide, methylene bis-acrylamide and an acrylamide polymerization catalyst directly onto a battery anode surface, said methylene bis-acrylamide being present in a mole ratio of one mole monomeric acrylamide to at least forty-six (46) moles of methylene bis-acrylamide, effecting the polymerization of said monomeric acrylamide and partial cross-linking of the resulting polyacrylamide in situ on said surface to produce a substantially insoluble, partially cross-linked polyacrylamide gelled coating on said anode.

6. The process as claimed in claim 5, wherein an uncatalyzed solution of the monomeric acrylamide and methylene bis-acrylamide is applied initially to said anode surface, and the acrylamide polymerization catalyst is thereafter applied to said coated surface.

7. A cell comprising a zinc electrode, a carbon electrode, a depolarizer mixture, an electrolyte, and a film on said zinc electrode and separating said zinc electrode and depolarizer mixture, said film comprising a hydrophilic, substantially insoluble, partially cross-linked polyacrylamide gel.

8. A cell comprising a zinc electrode, a carbon electrode, a depolarizer mixture, an electrolyte, and a film on said zinc electrode and separating said zinc electrode and depolarizer mixture, said film comprising a hydrophilic, substantially insoluble, partially cross-linked polyacrylamide gel containing mercuric chloride and battery electrolyte dispersed therein.

9. A dry-cell battery comprising a zinc electrode, a carbon electrode, a depolarizer mixture, a battery electrolyte, and a battery separator interposed between said zinc electrode and said depolarizer mixture, said battery separator comprising an inert backing material adjacent said depolarizer mixture, and a hydrophilic, substantially insoluble, partially cross-linked polyacrylamide gelled film adjacent said zinc electrode.

10. A composition of matter comprising a zinc base and a film thereon, said film comprising a hydrophilic, substantially insoluble, partially cross-linked polyacrylamide gel.

11. A composition of matter particularly adapted for use as a battery separator that comprises a hydrophilic, substantially insoluble, partially cross-linked polyacrylamide gel having dispersed therein battery electrolyte and mercuric chloride.

12. A composition of matter particularly adapted for use as a battery separator that comprises an inert backing material having coated thereon a hydrophilic, substantially insoluble, partially cross-linked polyacrylamide gel.

13. A composition of matter particularly adapted for use as a battery separator that comprises an inert backing material having coated thereon a hydrophilic, substantially insoluble, partially cross-linked polyacrylamide gel containing mercuric chloride dispersed therein.

14. A composition of matter particularly adapted for use as a battery separator that comprises an inert backing material having coated thereon a hydrophilic, substantially insoluble, partially cross-linked polyacrylamide gel containing dispersed therein battery electrolyte and mercuric chloride.

References Cited in the file of this patent

UNITED STATES PATENTS

| | | |
|---|---|---|
| 1,139,213 | Morrison | May 11, 1915 |
| 1,824,626 | Ruhoff | Sept. 22, 1931 |
| 2,173,005 | Strain | Sept. 12, 1939 |
| 2,229,431 | Young | Jan. 21, 1941 |
| 2,534,336 | Cahoon | Dec. 19, 1950 |
| 2,551,799 | Hatfield | May 8, 1951 |

FOREIGN PATENTS

| | | |
|---|---|---|
| 505,354 | Great Britain | May 5, 1939 |